United States Patent
Kemmler

(10) Patent No.: US 7,072,906 B2
(45) Date of Patent: Jul. 4, 2006

(54) COMPUTER-AIDED DATABASE SYSTEM AND METHOD FOR OPERATING IT

(75) Inventor: Andreas Kemmler, Massenbachhausen (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 10/718,746

(22) Filed: Nov. 21, 2003

(65) Prior Publication Data

US 2005/0086668 A1    Apr. 21, 2005

(51) Int. Cl.
*G06F 17/00* (2006.01)
*G06F 7/00* (2006.01)

(52) U.S. Cl. ..................... 707/103 R; 707/2
(58) Field of Classification Search ..... 707/100–104.1, 707/2; 717/114–116; 719/328–332
See application file for complete search history.

(56) References Cited

U.S. PATENT DOCUMENTS

| | | | | |
|---|---|---|---|---|
| 5,895,472 A | * | 4/1999 | Brodsky et al. | 707/203 |
| 6,230,311 B1 | * | 5/2001 | Gerard et al. | 717/108 |
| 6,407,761 B1 | * | 6/2002 | Ching et al. | 715/835 |
| 6,741,982 B1 | * | 5/2004 | Soderstrom et al. | 707/3 |

OTHER PUBLICATIONS

Patent Cooperation Treaty, PCT/US04/21915, *Applicant: SAP Aktiengessellschaft*, 2pgs.

* cited by examiner

*Primary Examiner*—Jean M. Corrielus
*Assistant Examiner*—Joon Hwan Hwang
(74) *Attorney, Agent, or Firm*—Blakely Sokoloff Taylor & Zafman LLP

(57) ABSTRACT

A computer-aided database system having an application layer in which, independently of one another, applications for registering data objects of various data object types into a database associated with a respective application can be executed, wherein there are a record layer which is encapsulated with respect to the application layer and in which a number of record writers each having a dynamic interface is implemented; by a table in which a data object type has a respective associated record writer, with the respective addressed application in the application layer, in response to a registration operation, producing information about the data object which is to be registered and about the registration in the form of a reference of prescribed structure, and with the record writer associated by means of the table being designed to access the reference and hence the information via the interface; and by a record registrar for permanently storing record object data, transferred by a record writer and comprising information about the data object which is to be registered and about the registration.

20 Claims, 1 Drawing Sheet

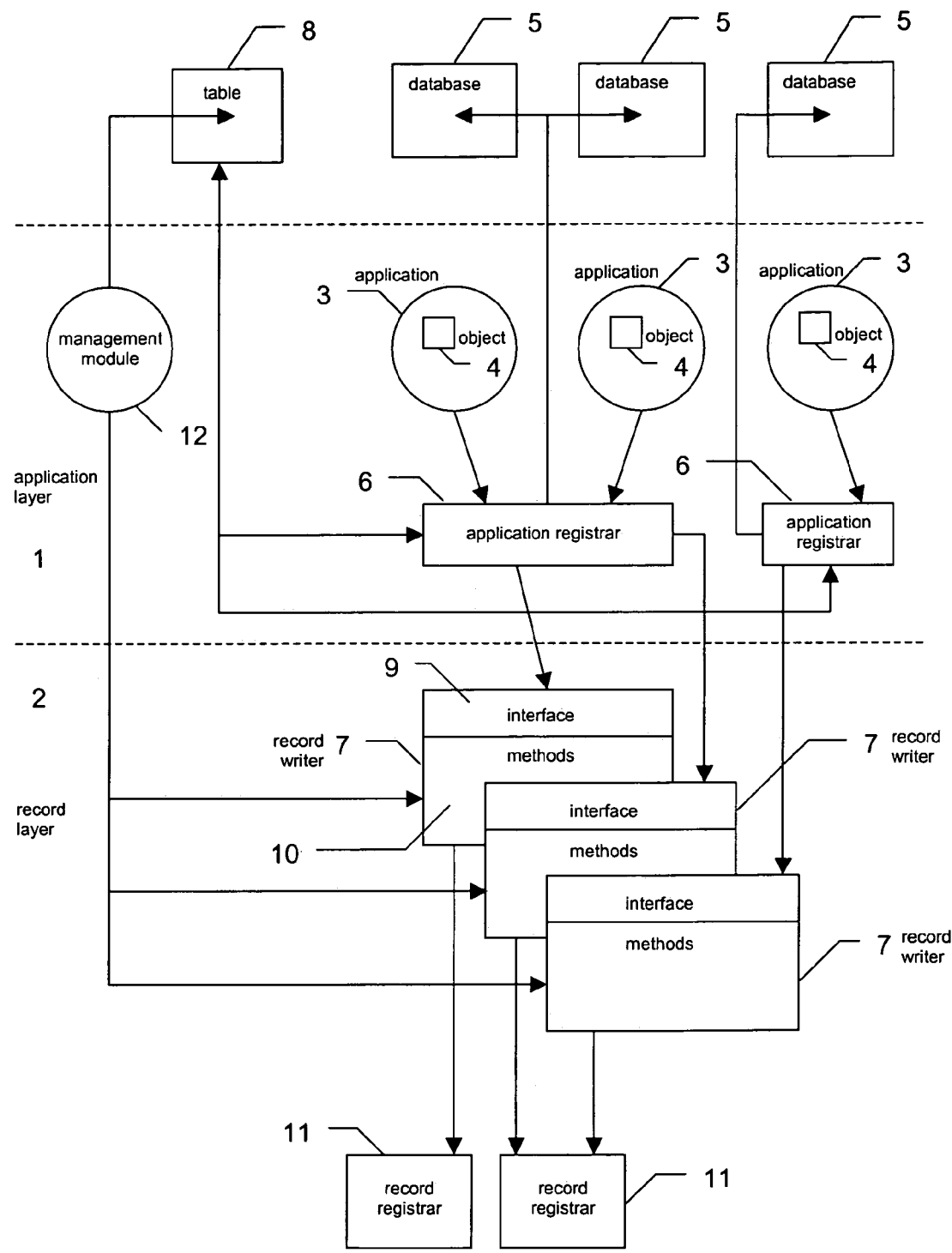

COMPUTER-AIDED DATABASE SYSTEM AND METHOD FOR OPERATING IT

The present patent application claims the priority benefit of the filing date of German Application No. 103 48 665.8 filed Oct. 15, 2003, which is incorporated by reference.

FIELD OF THE INVENTION

The invention relates to a computer-aided database system and to a method for operating a computer-aided database system.

BACKGROUND OF THE INVENTION

In a computer-aided database system, such as is used within the framework of SAP R/3, various applications which register, e.g., produce, change or erase, data objects of various data object types in a database associated with the respective application run independently of one another in an application program layer. Such applications are, by way of example, sub-applications of SAP R/3's HR module for personnel, that is to say personnel administration, organization management, personnel development, public sector and the like. To be able to establish which user has registered which data objects at which time, there is provision for record writing. This record writing stores the data object automatically in a database before and after registration, together with further information, for example relating to the registration time and to the user performing the registration. In this context, separate record writing needs to be firmly implemented for each application and each data object type on account of the various data objects and record requirements. The firmly implemented record writing operations have considerable redundancy in this case, which means that system resources such as memory space are wasted and considerable maintenance complexity also arises. In addition, the firm implementation is inflexible, since it cannot be changed by the database user. If requirements relating to the record writing or data objects are changed or redefined, this involves a high level of complex work. This becomes even greater when the firm record writing operations have a different interface according to data object type and hence need to be called up in different ways. Finally, the application cannot continue to be used during execution of the firmly implemented record writing operation, but rather first needs to wait until the latter has ended.

SUMMARY OF THE INVENTION

According to one aspect of the present invention, there is provided a computer-aided database system and a method for operating a computer-aided database system in which applications which register data objects of various data object types into a database associated with the respective application can be executed independently of one another in an application layer, where the respectively addressed application in the application layer, in response to a registration operation, produces information about the data object which is to be registered and about the registration, in the form of a reference of prescribed structure, calls up a record writer from a number of record writers (which are implemented in a record layer encapsulated with respect to the application layer) which is associated with the data object type by means of a table and uses a dynamic interface, the record writer accessing the reference and hence the information via the interface and transferring record object data having information about the data object which is to be registered and about the registration to a record registrar for the purpose of permanent storage.

The transfer of information using a reference to data may allow an interface which is open to all data object types and record writers regardless of their specific implementation. This may mean that the record writers can be used unchanged for various applications and data object types. In this exemplary case, the interface is in dynamic form that is to say is able to access the transferred data differently according to data object type. Together with the table which permits simple changing of the association between a data object type and various record writers, the record writing can easily be changed by the database user. By way of example, the registration of certain data objects can be recorded no longer as a result of association with a record writer, which does not create any records or can be recorded differently as a result of association with a different record writer. The result is more flexible adaptability while avoiding redundant coding. Since the record layer is additionally encapsulated with respect to the application layer, asymmetric execution of the record writing is made possible. Record writing can therefore work independently of the application, particularly in the background, while the application can continue to be used without restriction. The record layer is encapsulated by a program part, for example an ABAP function block, which is called up by the application layer, performs application-specific transformations on the information and transfers a reference of prescribed structure to the actual record writing.

The record writers may be in the form of ABAP classes which each contain the dynamic interface and at least one method for further processing of the transferred information. In this context, at least one basic ABAP class is provided. Differing solutions can inherit from this basic ABAP class, can complement, redefine or completely reimplement methods, which results in added adaptability of the record writers to changed requirements, particularly in interaction with the table.

In addition, a customizing table for further settings by database users may be provided. This expediently allows record writing to be activated or deactivated in detail for particular data object types and possibly sub-types on the basis of differentiation parameters. In this exemplary case, the customizing table may be evaluated before a record writer is called up, so that it is not necessary to call up the record writer for data whose registration is not intended to be recorded.

The method can be carried out by a computer program, which can be called up from an, in particular, interchangeable data storage medium and/or a data link.

Further, embodiments and advantages of the invention will become apparent from the following description, drawing and the claims.

BRIEF DESCRIPTION OF THE DRAWINGS

The invention is explained in more detail below using an exemplary embodiment, which is schematically shown in the appended FIGURE.

DETAILED DESCRIPTION OF AN EXEMPLARY EMBODIMENT

The database system shown comprises an application layer 1 and a record layer 2, encapsulated with respect to the latter, which are implemented as a computer program in a computer system. By way of example, the record layer 2 is implemented in ABAP-OO and is part of SAP BASIS, i.e. the software layer which forms the basis of almost all SAP applications, the SAP system being able to be used on Windows NT, for example.

In the application layer 1, applications 3 which register data objects 4 into databases 5 in response to user actions or automatically run independently of one another. In the SAP R/3 HR module, the data objects 4 are the information types.

The registration is expediently performed using application registrars 6. When a data object 4 is registered, e.g., created, changed or erased, by a database user or a process, the addressed application 3 calls up an associated application registrar 6. The application registrars 6 are program parts which run in the application layer 1 and may be associated with a plurality of applications 3 registering identical data objects 4, and, besides their main task, that of registering data objects 4 in databases 5, are also responsible for transferring information about the registration operation from the application layer 1 to the record layer 2. To this end, an application registrar 6 calls up an encapsulated program part, in this case a function block, which is part of the record writing and conditions the registration for the record writing. This program part produces a reference in line with a standard stipulation, for example in the form of a pointer to a data structure comprising pointers to the data object 4 before the change, the data object 4 after the change, the change time, the identifier of the user or process initiating the change, etc. One possible data structure is:

| HRCDOC_VALUES_REF | |
|---|---|
| OLD_VALUE_REF | TYPE REF TO DATA |
| NEW_VALUE_REF | TYPE REF TO DATA |
| CHG_INDICATOR | TYPE CDCHNGINDH |

In this context, a reference to a data object 4 before the change is transferred to OLD_VALUE_REF, and a reference to the data object 4 after the change is transferred to NEW_VALUE_REF, with CHG_INDICATOR indicating the type of registration. When a call is made, a reference to an object or to a structure comprising a plurality of objects can be transferred to OLD_VALUE_REF, for example. The transfer of information is thus open to all data object types regardless of their makeup. Only the internal makeup of the structure HRCDOC_VALUES_REF is binding for all application registrars 6 in this case.

When the reference has been created, a record writer 7 associated with the data object type can be called up. The associated record writer 7 is ascertained by accessing a table 8, which essentially has a column with data object types and a column with associated record writers 7. In this case, a record writer 7 can be associated with a plurality of data object types, but not the other way round.

Data object types whose registration does not need to be recorded can either be omitted from the table 8 or can be associated with a record writer 7, which does not create a record.

In addition, a customizing table for further settings by database users can be provided. In this case, the customizing table is preferably evaluated in the application layer 1 before the table 8 is evaluated for the purpose of assigning a record writer 7. By way of example, the customizing table has the following simplified structure:

| MANDT | INFTY | SUBTY | CDOC_ACTIVE |
|---|---|---|---|
| 001 | 1002 | * | + |
| 001 | 1002 | 1000 | + |
| 001 | 1000 | * | - |
| 001 | 9001 | 0099 | + |

In this context, the column CDOC_ACTIVE indicates for a data identifier MANDT 001, which is used to associate data with a particular area, in this case the client 001, and for various data object types, which in this case are classified using the differentiation parameters Infotype INFTY and Subtype SUBTY by way of example, whether record writing has been activated (+) or deactivated (−), with * being wildcard for all types. Other differentiation parameters can be used depending on the instance of application.

In this case, the record writers 7 are implemented in the form of an ABAP class, comprise an interface 9 and at least one method 10 and stipulate for the respective record object type which records with which information in which form need to be permanently stored.

The interface 9 is flexible, e.g., no objects or variables but rather, as described above, a reference thereto is transferred. The interface 9 is also dynamic and implements methods for receiving the information from the application layer 1, for ascertaining the data object type associated with the information, for conditioning record object data with information about the data object 4 which is to be registered and about the registration and possibly further data, and for calling up a record registrar 11 for producing and permanently storing a change record on the basis of the record object data, for example in the database 5 corresponding to the data object 4, in a special database or else in the form of a printout or the like.

The methods 10 implemented in the record writer 7 can contain, besides the methods of the interface 9, methods for setting up parameter tables for the record objects. In this case, each record object has an associated parameter table for data transfer to the record registrar 11, with the call being made generically according to the record object in the form of the ABAP statement CALL FUNCTION func parameter_tables. In this context, the parameter tables need to contain the correct formal parameters for the record registrar 11, which is to be called up. There can also be a method 10 for producing a key which combines fundamental information for the purpose of rapid searching, and expediently a method 10 for checking, whether the record writer 7 is actually responsible for the data object type of the transferred data object 4, so that any misassociation in the table 8 is recognized.

Expediently, the default solution provided for the record writer 7 is a basic ABAP class that can be used for a large portion of the data object types. The basic ABAP class expediently contains a plurality of different methods for various data object types. From the information transferred in the form of a reference, said basic ABAP class generates corresponding record object data and possibly associated parameter tables and provides methods for calling up a respective suitable record registrar 11.

On the basis of this basic ABAP class, it is possible to produce specific ABAP classes that take into account peculiarities of a respective data object type. In this case, the specific ABAP classes inherit the interface 9 and the methods 10 from the basic ABAP class, with additional methods 10 being able to be defined and/or the inherited methods 10 being able to be redefined in line with the requirements.

The application level 1 can also contain a management module 12 for managing and producing the instances of the ABAP classes which form the record writers 6 and possibly for maintaining the table 8 and/or the customizing table. The management module 12 can be used by a user of the database system who has the appropriate authorization. The management module 12 also encapsulates the central methods used by applications, application registrars, record writers etc. by virtue of their being called up, e.g. methods for setting up parameter tables for generically calling up the record registrars 11, methods for recognizing the parameters such as TCODE, UTIME, UDATE etc. which apply as standard to all record registrars 11 and/or record writers 7.

While the invention has been shown and described with reference to a preferred embodiment, it should be apparent to one of ordinary skill in the art that many changes and modifications may be made without departing from the spirit and scope of the invention as defined in the claims.

What is claimed is:

1. A computer-aided database system comprising:
   an application layer in which, independently of one another, applications for registering data objects of various data object types into a database associated with a respective application are executed, the respective application in the application layer, in response to a registration operation, producing information about the data objects and about the registration in a form of a reference to a prescribed structure;
   a record layer which is encapsulated with respect to the application layer and in which a number of record writers each having a dynamic interface are implemented;
   a table in which a data object type has a respective associated record writer, the record writer associated by means of the table being designed to access via the dynamic interface the reference and hence the information about the data objects and about the registration; and
   a record registrar for permanently storing record object data in the database; transferred by a record writer and comprising information about the data objects and about the registration.

2. The database system as claimed in claim 1, wherein the record writers have the same dynamic interface.

3. The database system as claimed in claim 1, wherein the record registrar is designed to produce and store a change record comprising a record object data.

4. The database system as claimed in claim 1, further comprising a customizing table upstream of the table, the customizing table to activate record writing for various data object types.

5. The database system as claimed in claim 4, wherein the customizing table contains differentiation parameters.

6. The database system as claimed in claim 1, further comprising a management module in the application layer for creating, changing or erasing a table entry.

7. The database system as claimed in claim 1, wherein the record writer is implemented in a form of a generic report preparation processor with methods and an interface.

8. The database system as claimed in claim 1, further comprising various record writers derived from a standard record writer for a standard data object type, wherein each of the various record writers inherits at least one of said standard record writer's methods and/or interface.

9. The database system as claimed in claim 1, wherein the record writers are created or changed during operation of the database system.

10. The database system as claimed in claim 1, wherein the information about the data objects comprises the data objects before registration, the data objects after registration, registration times for the data objects, and identifiers of initiating users or processes.

11. A method for operating a computer-aided database system having an application layer in which, independently of one another, applications which register data objects of various data object types into a database associated with a respective application are executed, comprising:
    a respectively addressed application in the application layer, in response to a registration operation, produces information about the data objects and about the registration of the data objects in a form of a reference to a prescribed structure and calls up a record writer from a number of record writers which is associated with a data object type by means of a table using a dynamic interface, the record writers implemented in a record layer encapsulated with respect to the application layer;
    the record writer accesses via the dynamic interface the reference and hence the information about the data objects and about the registration via the dynamic interface, and transfers record object data having the information about the data objects and about the registration to a record registrar; and
    the record registrar permanently stores the record object data in the database.

12. The method as claimed in claim 11, wherein the record writers use the same dynamic interface.

13. The method as claimed in claim 11, wherein the record registrar produces a change record from a record object data and stores said change record.

14. The method as claimed in claim 11, wherein evaluation of the table is preceded by evaluation of a customizing table to activate record writing for various data object types.

15. The method as claimed in claim 14, wherein the customizing table contains differentiation parameters.

16. The method as claimed in claim 11, wherein a table entry is created, changed or erased by a management module in the application layer.

17. The method as claimed in claim 11, wherein the record writer is implemented in a form of a generic report preparation processor with methods and an interface.

18. The method as claimed in claim 11, wherein various record writers are used, each of the record writers being derived from a standard record writer for a standard data object type and inheriting at least one of said standard record writer's methods and/or interface.

19. The method as claimed in claim 11, wherein a record writer is created or changed during operation of the database system.

20. The method as claimed in claim 11, wherein the information about the data objects used comprises the data objects before registration, the data objects after registration, registration times for the data objects, and identifiers of initiating users or processes.

* * * * *